A. B. HARRIS.
TILLING MACHINE.
APPLICATION FILED AUG. 29, 1914.

1,133,956.

Patented Mar. 30, 1915.
2 SHEETS—SHEET 1.

Witnesses:

Inventor,
A. B. Harris.
By Victor J. Evans,
Attorney

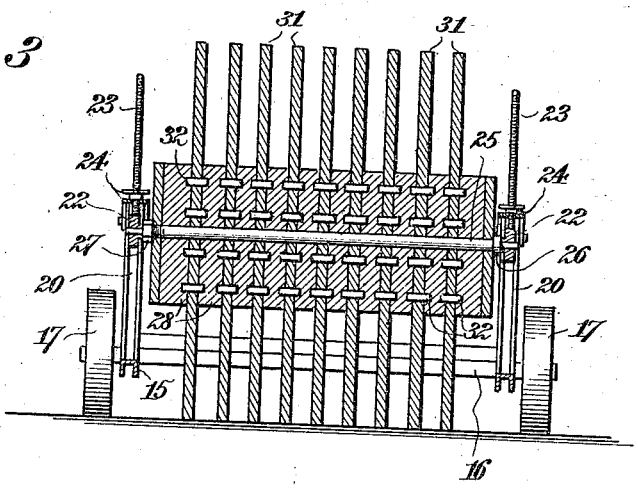
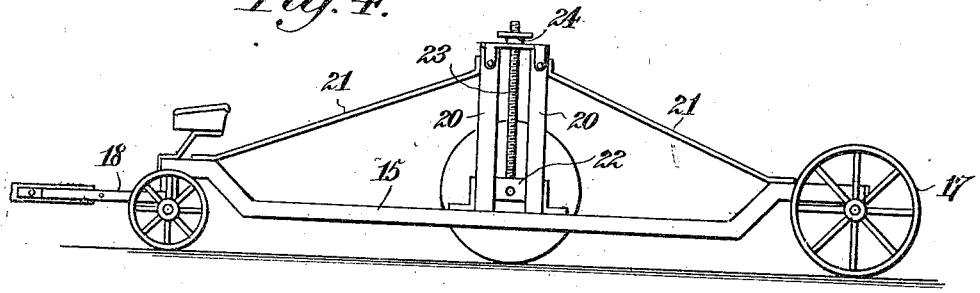
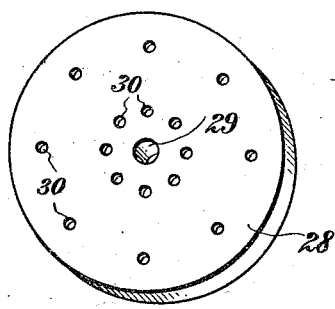
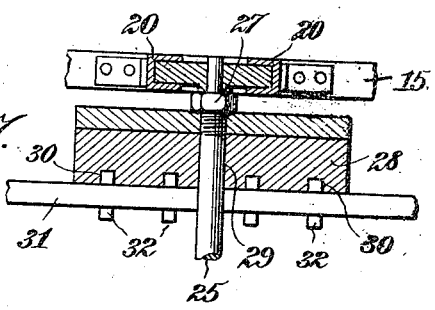

UNITED STATES PATENT OFFICE.

ASA B. HARRIS, OF VIENNA, ILLINOIS.

TILLING-MACHINE.

1,133,956.   Specification of Letters Patent.   Patented Mar. 30, 1915.

Application filed August 29, 1914. Serial No. 859,189.

*To all whom it may concern:*

Be it known that I, ASA B. HARRIS, a citizen of the United States, residing at Vienna, in the county of Johnson and State of Illinois, have invented new and useful Improvements in Tilling-Machines, of which the following is a specification.

This invention relates to soil tilling machines, and it has for its object to produce a tilling machine having a rotary element of simple and improved construction which may be used for breaking, crushing and agitating the soil, leaving roots and trash exposed on the surface where it will quickly decay and form a nutrient for the soil and also loosening the soil to a considerable depth in order that it may be well fitted to retain moisture, thereby producing a machine which will be peculiarly fitted for operation on the hillsides where ordinarily the precipitation will be carried off, thereby not only losing the benefits of the moisture, but also involving the loss of valuable soil that is apt to be carried away by freshets.

A further object of the invention is to produce a machine having a rotary element of the class described which may be readily converted into a roller that may be used for the purpose of packing and compacting the soil.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

Figure 1:
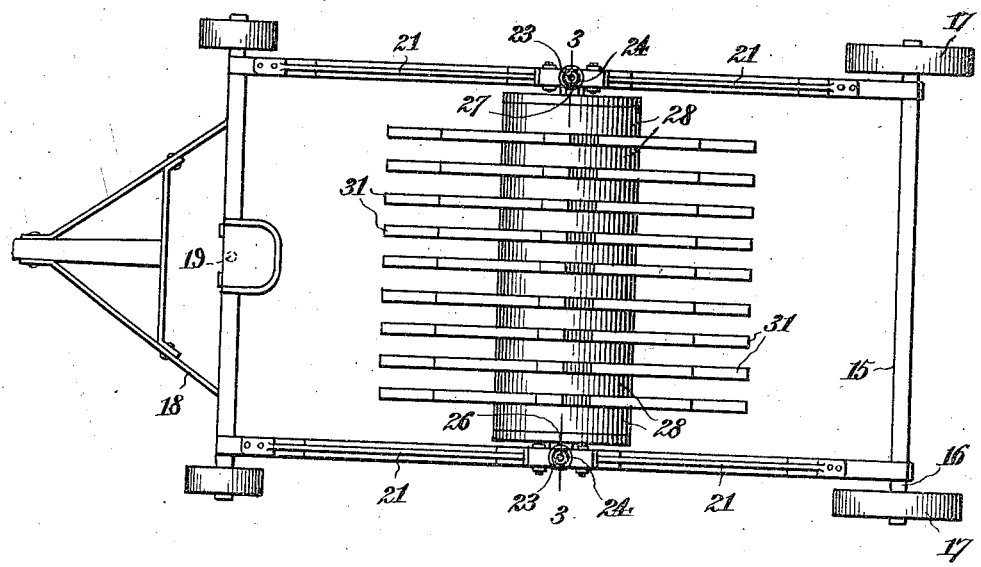
Figure 2:
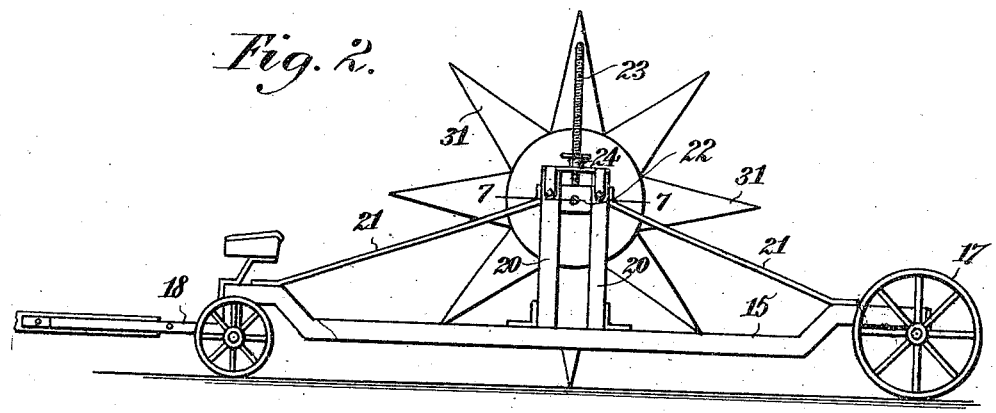
Figure 6:
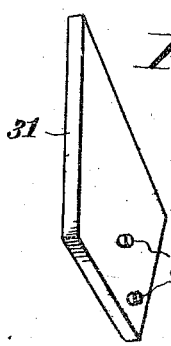

In the drawings,—Figure 1 is a plan view of a machine constructed in accordance with the invention. Fig. 2 is a side elevation of the same. Fig. 3 is a sectional view taken longitudinally through the rotary element on the line 3—3 in Fig. 1. Fig. 4 is a side elevation showing the machine converted into a roller. Fig. 5 is a perspective detail view of one of the cylinders used in the construction of the device. Fig. 6 is a perspective detail view of one of the blades. Fig. 7 is a horizontal sectional view taken on the line 7—7 in Fig. 2.

Corresponding parts in the several figures are denoted by like characters of reference.

A rectangular frame 15 which is constructed preferably of channel iron is provided with a rear axle 16 having ground wheels 17, the front end of the frame being supported on a truck 18 with which it is connected by a king bolt 19 to provide for the convenient steering of the machine. The side members of the frame support upright guides 20 which are reinforced by braces 21, said guides being equipped with vertically slidable boxes or bearing members 22 for the vertical adjustment of which screws 23 having nuts 24 are provided. The boxes 22 afford bearings for a shaft 25 having at one end a collar or flange 26, the other end being provided with a nut 27 threaded thereon for the purpose of retaining in position a plurality of cylinders 28 which are mounted on said shaft. The cylinders 28 are made of heavy material, such as cast iron, and each is provided with an axial bore 29 engaging the shaft; each cylinder is also provided in the end faces thereof with recesses 30 arranged in radial series.

The cutting blades 31, which are adapted to be mounted between the opposed faces of the cylinders 28, are approximately diamond-shaped, and are so proportioned that a predetermined number, preferably eight blades, will fill the interspace between the opposed faces of two cylinders. Each blade is provided with pins 32 extending transversely therethrough for engagement with the recesses 30 in the end faces of the cylinders, said recesses being obviously properly disposed with reference to the blades to be connected therewith.

It will be readily understood that in assembling the parts of the device for operation, the cylinders 28 are mounted on the shaft alternately with the blades, a set of blades being arranged between the opposed faces of adjacent cylinders. After a proper number of cylinders and blades have been mounted on the shaft, the nut 27 is applied thereto and tightened, after which the shaft may be mounted for operation in the bearing members 22.

By manipulating the nuts 24 on the screws 23 attached to the bearing members, the latter may be raised or lowered with respect to the frame, thereby effecting vertical adjustment of the rotary element comprised by the shaft 25 and related parts. The soil may thus be engaged to any desired depth, the rotary element being rotated by engagement of the teeth with the soil, and the latter being broken, crushed and agitated by the progress of the machine. It is also evident that the roots, stalks and other trash remaining from previous crops will be left exposed on the surface of the ground where it will quickly decay, thus forming a valuable fertilizing material.

By the operation of this machine the soil will be cut and agitated to a considerable depth, and an excellent seed bed will be formed in addition to which the soil subjected to the action of the machine will be left in excellent condition for the retention of moisture.

By removing the blades from the rotary element, a roller will be formed whereby the surface of the soil may be crushed and leveled when desired.

Having thus described the invention, what is claimed as new, is:—

In a machine of the class described, a rotary element comprising a shaft, a plurality of cylinders mounted thereon, said cylinders being provided with radially disposed series of recesses in the end faces thereof, and approximately diamond-shaped blades arranged between the opposed faces of the cylinders, said blades being provided with transverse pins engaging the recesses in the end faces of the cylinders.

In testimony whereof I affix my signature in presence of two witnesses.

ASA B. HARRIS.

Witnesses:
G. H. HUFFMAN,
J. M. PRICE.